US006592320B1

(12) United States Patent
Adams et al.

(10) Patent No.: US 6,592,320 B1
(45) Date of Patent: Jul. 15, 2003

(54) QUICK CONNECT/DISCONNECT TANK LIFTING BRACE AND METHOD OF USE

(75) Inventors: Ben A. Adams, Berwick, LA (US); Chris G. Cooper, Morgan City, LA (US)

(73) Assignee: Diamond Tank Rentals, Inc, Morgan City, LA (US)

( * ) Notice: Subject to any disclaimer, the term of this patent is extended or adjusted under 35 U.S.C. 154(b) by 0 days.

(21) Appl. No.: 10/139,840

(22) Filed: May 7, 2002

Related U.S. Application Data

(62) Division of application No. 09/791,495, filed on Feb. 22, 2001.

(51) Int. Cl.[7] .................................................. B65G 9/00

(52) U.S. Cl. ..................... 414/620; 294/106; 294/110.1

(58) Field of Search ................................ 414/620, 626, 414/618, 911; 294/110.1, 81.2, 81.61, 81.62, 62.31, 106

(56) References Cited

U.S. PATENT DOCUMENTS

| | | | | |
|---|---|---|---|---|
| 1,444,900 A | | 2/1923 | Blaw | |
| 1,673,237 A | * | 6/1928 | Gerdes | 294/110.1 |
| 1,764,623 A | | 6/1930 | Grondahl | |
| 1,822,629 A | | 9/1931 | McIlvried | |
| 1,846,038 A | | 2/1932 | Owens | |
| 1,968,135 A | | 7/1934 | Fildes | |
| 1,975,194 A | | 10/1934 | Courtney | |
| 2,007,187 A | | 7/1935 | Fitch | |
| 2,030,863 A | | 2/1936 | Fitch | |
| 2,047,138 A | | 7/1936 | Fildes | |
| 2,047,139 A | | 7/1936 | Fildes | |
| 2,047,140 A | | 7/1936 | Fildes | |
| 2,048,144 A | | 7/1936 | Showers, Jr. | |
| 2,080,813 A | | 5/1937 | Fildes | |
| 2,119,547 A | | 6/1938 | Knerr | |
| 2,198,652 A | | 4/1940 | Cullen et al. | |
| 2,842,391 A | | 7/1958 | Hermann | |
| 3,044,819 A | | 7/1962 | Pierre | |
| 3,078,115 A | | 2/1963 | Hartlander et al. | |
| 3,106,421 A | | 10/1963 | Wyrough | |
| 3,148,909 A | | 9/1964 | Tantlinger | |
| 3,261,637 A | * | 7/1966 | Bopp et al. | 294/110.1 X |
| 3,352,591 A | | 11/1967 | Casey | |
| 3,453,017 A | | 7/1969 | Nagy | |
| 3,455,593 A | * | 7/1969 | Moro | 294/110.1 |
| 3,695,667 A | | 10/1972 | Dempsey | |

(List continued on next page.)

FOREIGN PATENT DOCUMENTS

| | | | | |
|---|---|---|---|---|
| FR | 2576007 | * | 7/1986 | 294/90 |
| JP | 5-294593 | * | 11/1993 | 294/110.1 |
| JP | 405294593 A | * | 11/1993 | 294/110.1 |
| JP | 6-144769 | * | 5/1994 | 294/90 |
| JP | 406144769 A | * | 5/1994 | 294/90 |

*Primary Examiner*—Christopher P. Ellis
*Assistant Examiner*—Richard Ridley
(74) *Attorney, Agent, or Firm*—Raymond G. Areaux, Esq.; Disa Velez

(57) ABSTRACT

A quick connect/disconnect tank lifting brace which lifts a tank from an overhang of it's top lid or cover. The brace includes a crossbar, preferably adjustable, with pivotal end clamps at opposite ends of the crossbar. A pair of clamp pivoting assemblies are provided. Each clamp pivoting assembly pivots a respective one of the pivotal end clamps between an open position and a closed position and biases the pivotal end clamp to an open position for quick connection and disconnection. Pivoting is accomplished using an actuating rod parallel to the crossbar and coupled to the pair of pivoting assemblies. Articulation of the actuating rod effectuates, in unison, pivoting of each pair of pivot arms via the pivoting assemblies to a closed position. The pivoting assemblies generally utilize a push to close and pull to open motions.

17 Claims, 5 Drawing Sheets

U.S. PATENT DOCUMENTS 3,899,205 A 8/1975 Lanigan et al.
4,035,010 A * 7/1977 Kawashita et al. ...... 294/81.62
4,221,419 A * 9/1980 Riley et al. ................. 294/106
4,360,110 A * 11/1982 Sigman et al. .............. 212/318
4,563,031 A 1/1986 Kishimoto et al.
4,573,862 A * 3/1986 Anderson .............. 198/750.11
4,621,852 A * 11/1986 Maki ......................... 294/86.4
5,524,947 A 6/1996 Mojden et al.
5,639,197 A * 6/1997 Cummins et al. ......... 294/90 X
5,967,582 A * 10/1999 Saito ....................... 294/110.1
6,237,978 B1 * 5/2001 Bliss ........................... 294/88

* cited by examiner

QUICK CONNECT/DISCONNECT TANK LIFTING BRACE AND METHOD OF USE

CROSS REFERENCE TO RELATED APPLICATIONS

This application is a divisional application of and claim priority from U.S. patent application having Ser. No. 09/791, 495, filed Feb. 22, 2001, incorporated herein by reference.

TECHNICAL FIELD

The present invention relates to lifting devices and, more particularly, to a quick connect/disconnect tank lifting brace for rapidly lifting and transporting heavy tanks such as used in the oil field environment offshore or onshore.

BACKGROUND OF THE INVENTION

At times, during drilling operations, drill cuttings and other debris or waste cannot be simply discarded into the water. As a result, during drilling operations efforts are undertaken to discard the drill cuttings and other debris or waste (hereinafter sometimes referred to as "drill cuttings").

Depending on the hole size, penetration rate and the depth of the hole, tens to thousands of barrels of drill cuttings are produced. Depending on the size of the tank, a tank may store between 13½ to 25 barrels of drill cuttings. The "real estate" in the offshore oil field environment is very limited. Thus, the drill cuttings must be hauled from the offshore platform and discarded onshore. However, there is still the problem of limited real estate that can be used on the offshore platform/rig/dock for storage tanks.

It is estimated that drilling costs approximately $2,000 to $10,000 per hour. Therefore, there are numerous attempts to reduce the duration of the drilling operations even if over time a mere hour is saved. As can be appreciated, offshore platforms or rigs used in deep water drilling are more costly by virtue of their distance from land, depth to the earth's surface, etc.

Presently, the tanks employed in drilling operations have eyelets or padeyes at the corners of the tanks for coupling the lifting cables to the tank. Coupling the lifting cables to the eyelets (padeyes) or other discretely positioned couplers, affixed a to the tank, could be performed rapidly if four laborers were present at each corner to connect and subsequently disconnect the lifting cables from the eyelets (padeyes) or other discretely positioned couplers. As can appreciated, this is prohibitive and a waste of valuable labor.

Most often, one to two men are used to couple a sling to the corner eyelets or padeyes of the tank. The total tank turnaround time to lift, via a crane, and connect the sling to a tank, transport the tank, disconnect the sling and return the sling to the next tank takes approximately fifteen (15) minutes per tank. With current technology, a tank can be filled with 25 barrels of drill cuttings in approximately five (5) minutes. Thus, at times, the drilling operations are limited to the tank turnaround time in which these tanks can be removed and replaced using one (1) crane.

I predict that the turnaround time for the quick connect/ disconnect tank lifting brace of the present invention is approximately seven (7) minutes or about one-half the turnaround time of the sling. This is particular advantageous for drilling the top of a wellhole since, at the top of the wellhole, more drill cuttings are generated.

As will be seen more fully below, the present invention is substantially different in structure, methodology and approach from that of prior lifting devices.

SUMMARY OF THE INVENTION

The preferred embodiment of the quick connect/ disconnect tank lifting brace of the present invention solves the aforementioned problems in a straight forward and simple manner.

Broadly, what is provided is a quick connect/disconnect tank lifting brace for use with a tank with a top lid or cover having an overhang. The tank lifting brace comprises an adjustable crossbar having distal ends and two pivotal end clamps wherein each end clamp is pivotally coupled to a respective one of the distal ends. A pair of clamp pivoting assemblies is included wherein each clamp pivoting assembly pivots a respective one of the pivotal end clamps via a pair of pivot arms. Pivoting is accomplished via a threaded actuating rod parallel to the adjustable crossbar and coupled to the pair of pivoting assemblies wherein rotation of the threaded actuating rod effectuates, in unison, pivoting of each pair of pivot arms via the pivoting assemblies.

In view of the above, an object of the present invention is to provide a quick connect/disconnect tank lifting brace with a pair of clamp pivoting assemblies which are spring biased via a spring biasing force for biasing the end clamps to an open position. Thus, in operation, when the quick connect/ disconnect tank lifting brace (without a tank) is being lifted by a crane or hoist via lifting cables, the force exerted by the lifting cables onto the clamp pivoting assemblies does not significantly overpower the spring biasing force and thus leaves the jaws (the end clamps) essentially open and suitable for clutching a tank. In other words, this feature allows the quick connect/disconnect tank lifting brace to remain in an open position which, when transported to the top of a tank, allows such lifting brace to easily be positioned for clamping the tank. Advantageously when the end clamps are in a closed position, if the end clamps are not locked, the lifting force can automatically lock the end clamps and their pivotal rotation.

The present invention further contemplates a quick connect/disconnect tank lifting brace for use with a tank with a top lid or cover having an overhang comprising a crossbar having distal ends and pivotal end clamps, each end clamp pivotally coupled to a respective one of the distal ends. The brace further includes a pair of clamp pivoting assemblies, each clamp pivoting assembly pivots a respective one of the pivotal end clamps between an open position and a closed position and biases said respective one of the pivotal end clamps to said open position. Furthermore, the brace includes an actuating rod parallel to the adjustable crossbar and coupled to the pair of pivoting assemblies wherein articulation of the actuating rod effectuates, in unison, pivoting of each pair of pivot arms via the pivoting assemblies to a closed position.

The present invention further contemplates a quick connect/disconnect tank lifting brace for use with a tank with a top lid or cover having an overhang comprising a crossbar having distal ends and pivotal end clamps, each end clamp pivotally coupled to a respective one of the distal ends. The brace further includes a pair of clamp pivoting assemblies, each clamp pivoting assembly pushes to pivotally close, via a pushing motion, and, alternately, pulls to pivotally open, via a pulling motion, a respective one of the pivotal end clamps and biases said respective one of the pivotal end clamps to an open position. The motion is carried out using an actuating track mechanism coupled to the adjustable crossbar and coupled to the pair of pivoting assemblies wherein actuation of the actuating track mechanism effectuates, in unison, the pushing motion to pivot the end clamps to a closed position or the pulling motion to pivot the end clamps back to the open position.

Another object of the present invention is to provide a quick connect/disconnect tank lifting brace having end clamps with two end plates fixedly secured in parallel spaced relation via a cross pivoting rod pivotally coupled to the adjustable crossbar. Each end plate comprises a forward portion having formed therein a mouth or an opening; a central portion affixed to the cross pivoting rod; and a rear portion having a hole formed therein for attaching thereto a lifting cable.

The present invention contemplates a pair of end plates which include a central portion having a protruding arc-shaped edge which (1) defines an arc of rotation of the end clamps for rotating the mouth or opening in and out of the open and closed positions; and (2) footing for balancing the quick connect/disconnect tank lifting brace. Moreover, the mouth or opening has a generally squared "C" shaped profile.

It is a still further object of the present invention to provide a quick connect/disconnect tank lifting brace which includes shackles for coupling lifting cables to the end clamps. Thereby, during lifting, the weight of a tank is transferred to the lifting cables to counterbalance the force exerted by the weight of the tank directly applied to the forward portions of the parallel plates.

Additionally, what is provided is a method of lifting of a tank with a quick connect/disconnect tank lifting brace comprising the steps of: positioning the quick connect/disconnect tank lifting brace over a top cover or lid of a tank; applying a pivoting force to effectuate pivoting, in unison, of end clamping members having a mouth so that an overhang of the top cover or lid is received in the mouth; and, lifting the rear-ends of the end clamping members with lifting cables affixed thereto to effectuate a lifting force to an underside of the overhang and providing a counterbalancing moment force to counterbalance the weight of the tank.

A still further object of the present invention is to provide a counterbalancing moment which compensates proportionately for the weight of the tank so that the end clamps in the closed position or the locked position, under the weight of the tank, do not rotate in a direction which would "spit-out" or otherwise unclamp or disengage the overhang of the tank.

The present invention further contemplates a method of lifting of a tank with a quick connect/disconnect tank lifting brace having end clamps, each end clamp having a central rotation section with a forward depending mouth and a dependant rear-end, and the tank having sidewalls and a top cover or lid extending beyond the sidewalls to produce an overhang. The method's second step includes first positioning the quick connect/disconnect tank lifting brace over a top cover or lid of a tank. The second step includes applying a pivoting force to effectuate pivoting, in unison, of the end clamps so that the overhang of the top cover or lid is received in the mouth. The method's third step includes lifting the rear-ends of the end clamps with lifting cables affixed thereto to effectuate a lifting force to an underside of the overhang and a counterbalancing moment force to counterbalance the weight of the tank.

The method of the present invention contemplate a second step which includes pivoting, in unison, the end clamps until a front surface of each end clamp abuts or is in direct contact with a sidewall of the tank to effectuate locking of the end clamps in a closed position.

The present invention further contemplates a method of lifting of a tank with a quick connect/disconnect tank lifting brace having end clamps, each end clamp having a central rotation section with a forward depending mouth and a dependant rear-end, and the tank having sidewalls and a top cover or lid extending beyond the sidewalls to produce an overhang. The method's first step includes applying a spring biasing force to the end clamps to maintain the mouth in an open position. The method's second step includes, during the first step, lifting and maneuvering the quick connect/disconnect tank lifting brace with a lifting force less than the spring biasing force. The lifting force is substantially equal to the weight of the lifting brace. Thus, the heavier the lifting brace, the more the spring biasing force. The method's third step includes, during the second step, positioning the quick connect/disconnect tank lifting brace over a top cover or lid of a tank. The method's fourth step includes applying a pivoting force to effectuate pivoting, in unison, of the end clamps so that the overhang of the top cover or lid is received in the mouth. In other words, the jaws (the end clamps) are clamped down. The method's fifth step includes lifting the rear-ends of the end clamps with lifting cables affixed thereto to effectuate a lifting force to an underside of the overhang and a counterbalancing moment force to counterbalance the weight of the tank.

In view of the above objects, it is a feature of the present invention to provide a quick connect/disconnect tank lifting brace which is relatively simple structurally and thus simple to manufacture, operate and maintain.

Another feature of the present invention is to provide a quick connect/disconnect tank lifting brace which is durable and strong.

A further feature of the present invention is to provide a quick connect/disconnect tank lifting brace which is adapted to save time and cost, associated with oilfield operations, through the reduction in time to accomplish the connection and disconnection of the brace to and from a tank used to discard drill cuttings or other waste and debris.

An advantage of the present invention is the spring biasing of the end clamps to an open position. Thus, when connecting the brace of the present invention, a laborer does not have to waste time opening the end clamps so that they may be subsequently coupled around an overhang of a tank. The spring biasing keeps the end clamps open while the lifting brace is being positioned over the tank and allows the end clamps to be quickly closed.

A further advantage of the present invention is the removal of any play in the pivoting assemblies so that the minimum number of revolutions of the threaded actuating rod is needed for the pivotal rotation of the pivotal end clamps in and out of the closed and open positions.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
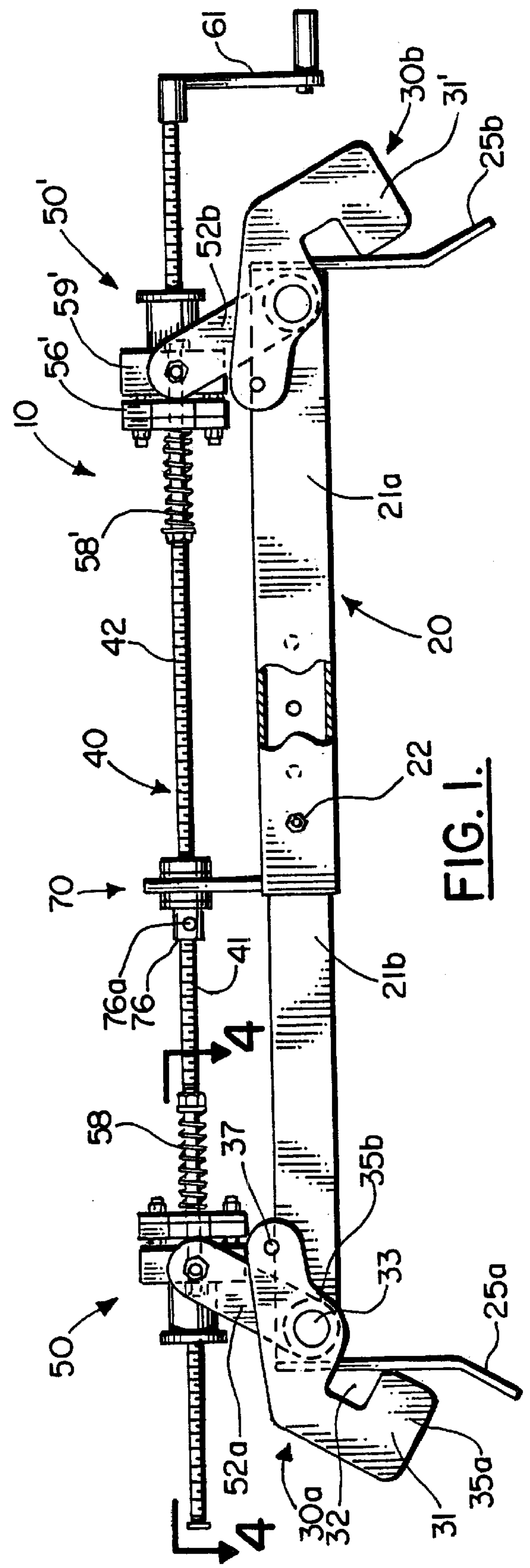
FIG. 1 illustrates a side view of the quick connect/disconnect tank lifting brace of the present invention in an open position.
Figure 2:
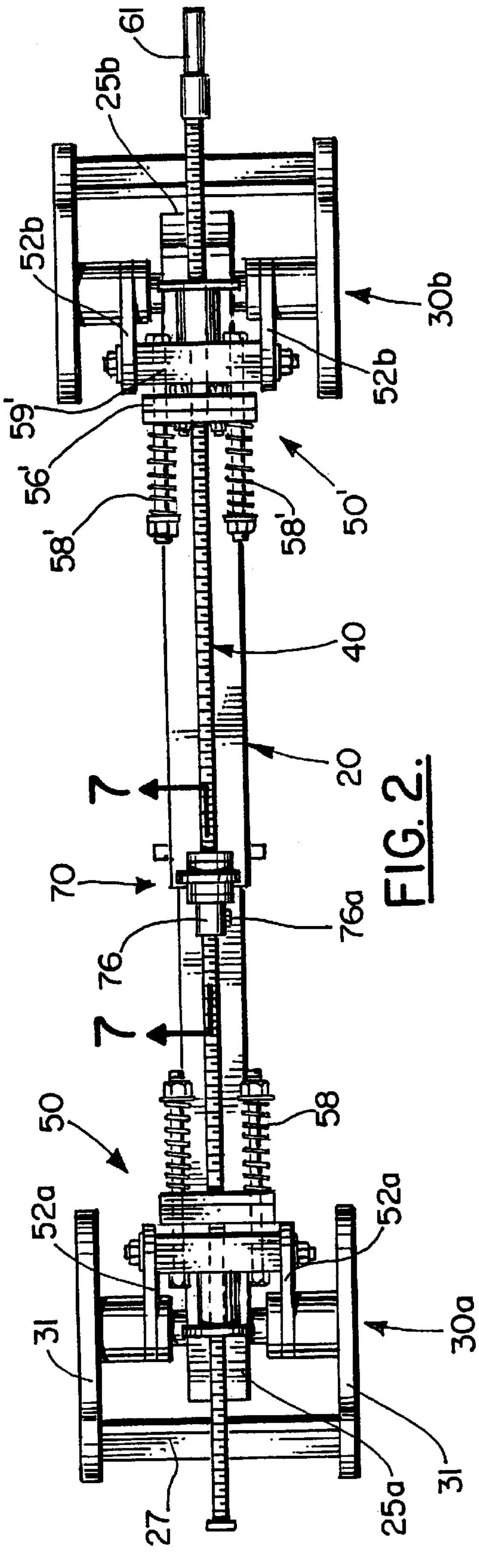
FIG. 2 illustrates a top view of the quick connect/disconnect tank lifting brace of the present invention.

Referring now to FIGS. 1–5, the quick connect/disconnect tank lifting brace of the present invention is designated by the reference numeral 10. In the preferred embodiment, the tank lifting brace 10 is constructed and arranged to be placed on the top lid or cover of tank 5. The lid or cover of tank 5 includes an overhang 5*a* from which the tank 5 is to be lifted. The tank 5 is adapted to be loaded and unloaded from an oil well platform or rig, dock, barge or other water vessel. In the preferred embodiment, the lid or cover of tank 5 has corner padeyes (eyelets) or discrete position couplers (NOT SHOWN) which are commonly found on lifting tanks suitable for use in the oil field. The padeyes provide a secondary means of lifting the tank 5 if necessary. Furthermore, in operation, the corner padeyes (eyelets) provide a safety mechanism or corner stoppers to prevent the lifting brace 10 from sliding off of the tank 5 in the event of an imbalance. The tanks 5 also include spaced vertical supports 4 on the sidewalls of the tank 5. The spaced vertical supports 4 provide another safety feature, as will be described in more detail later.

The quick connect/disconnect tank lift brace 10 includes an adjustable crossbar member 20 having pivotal end clamps 30*a* and 30*b* coupled to distal ends of the adjustable crossbar member 20. The tank lifting brace 10 further includes clamp pivoting assemblies 50 and 50', each clamp pivoting assembly 50 or 50' includes a pair of pivot arms 52*a* and 52*b*, respectively, coupled to end clamp 30*a* or 30*b*, respectively, and a threaded actuating rod 40 aligned parallel to the adjustable crossbar member 20 and coupled to the two clamp pivoting assemblies 50 and 50'. During connection or disconnection, rotation of the thread actuating rod 40 effectuates, in unison, pivoting of each pair of pivot arms 52*a* and 52*b* via the clamp pivoting assemblies 50 and 50', respectively.

In the exemplary embodiment, threaded actuating rod 40 is rotated via a handle member 61. When the handle member 61 is rotated, threaded actuating rod 40 is rotated accordingly to effectuate the pivoting motion of the pivotal end clamps 30*a* and 30*b* in unison between an open position and a closed position, depending on the direction of rotation. With respect to the handle member 61, the handle member 61 may be substituted with a wheel. Additionally, the handle member 61, wheel, or threaded actuating rod 40 may have a means to connect an impact gun or other electric air or hydraulic powered device thereto so that threaded actuating rod 40 could be rotated via a mechanical device instead of manual power. Although, not shown, in the preferred embodiment, brace 10 is equipped with two handle members 61 secured to opposite ends of threaded actuating rod 40. Therefore, during connection or disconnection, a laborer would have access to either side.

While the exemplary embodiment illustrates a threaded actuating rod 40, the threaded actuating rod 40 functions as a track which will be seen more clearly from the detailed description of the overall operation of the clamp pivoting assemblies 50 and 50'. Other tracking means could be substituted for the threaded actuating rod 40.

Adjustable crossbar member 20 includes two mated sections 21*a* and 21*b* wherein one end of mated section 21*b* is adapted to slide in one end of mated section 21*a* to adjust the length of the adjustable crossbar member 20. The free ends of the mated sections 21*a* and 21*b* have attached thereto end clamps 30*a* and 30*b*, respectively. The two mated sections 21*a* and 21*b* are secured to a selected length via a fastener 22 such as a screw or bolt and nut. The mated sections 21*a* and 21*b* include holes which are adapted to be aligned so as to couple the fastener 22 therethrough.

The free ends of the mated sections 21*a* and 21*b* have fixedly secured to the distal ends thereof guide members 25*a* and 25*b*, respectively. The guide members 25*a* and 25*b* are perpendicular to the adjustable crossbar member 20, as best seen in FIG. 1. These guide members 25*a* and 25*b* assure that the crossbar member 20 is essentially parallel to the overhang 5*a* of tank 5. Thereby, the pivotal rotation of the end clamps 30*a* and 30*b* to the clamping position around overhang 5*a* is not compromised.

Referring now to the end clamps 30*a* and 30*b*, since they are identical, only one end clamp 30*a* will be described in detail. End clamp 30*a* includes two (a pair of) plates 31 fixedly secured in parallel spaced relation via pivot rod member 33 (FIG. 4) and coupler 27, as best seen in FIG. 4. The profile of end clamp 30*a* is best seen in FIGS. 1, 3, 5, and 6. The forward portion 35*a* of each of the plates 31 includes a fixed mouth or opening 32 dimensioned to receive therein the overhang 5*a* of tank 5 when end clamp 30*a* is in the clamping position, as best seen in FIG. 6. The end clamps 30*a* and 30*b* are the primary means of securing of tank lifting brace 10 to tank 5.

The fixed mouth or opening 32 has a generally squared "C"-shaped profile. The term "squared 'C'-shaped profile" is used to define a "C"-shape which is less curved and wherein at least the top and bottom interior surface 32*a* and 32*b* of the "C"-shaped profile is generally straight. Moreover, the forward lower exterior surface 32*c* is also generally straight.

The profile of each plate 31 further includes a central portion 35*b* and a rear portion 35*c*. The central portion 35*b* is pivotally coupled to the adjustable crossbar member 20 via pivot rod member 33. The rear portion 35*c* has formed therein an eyelet (padeye) or hole 37 or other means for securing a lifting cable 7 thereto. In the exemplary embodiment, a shackle 39 is secured in the eyelet or padeye 37.

The central portion 35*b* of each parallel plate 31 has a protruding arc-shaped edge 35*b'* which defines an arc of rotation of the end clamp 30*a* for rotating the mouth or opening 32 in and out of the open and closed positions. Moreover, the protruding arc-shaped edge 35*b'* provides the footing for balancing the quick connect/disconnect tank lifting brace 10 on top of tank 5. In other words, the protruding arc-shaped edge 35*b'* provides a rocking surface from where the end clamp rocks, rotates or transitions between the open and closed positions while the lifting brace 10 is sitting on top of tank 5. While the lifting brace 10 can be clamped to the tank 5 without resting the lifting brace 10 on the top of tank 5, in operation (especially on vessels in heavy seas), it may be advantageous to rest the lifting brace 10 on the tank 5 and let the cables 7 go slack.

The protruding arc-shaped edge 35*b'* has a forward edge portion which has a portion thereof which is integral with the top interior surface 32*a* of the "C"-shaped profile of the mouth or opening 32. The protruding arc-shaped edge 35*b*' also has a rear edge portion, the end of which merges into the rear portion 35*c* such that the rear portion 35*c* is elevated above the protruding arc-shaped edge 35*b*'.

Figure 3:
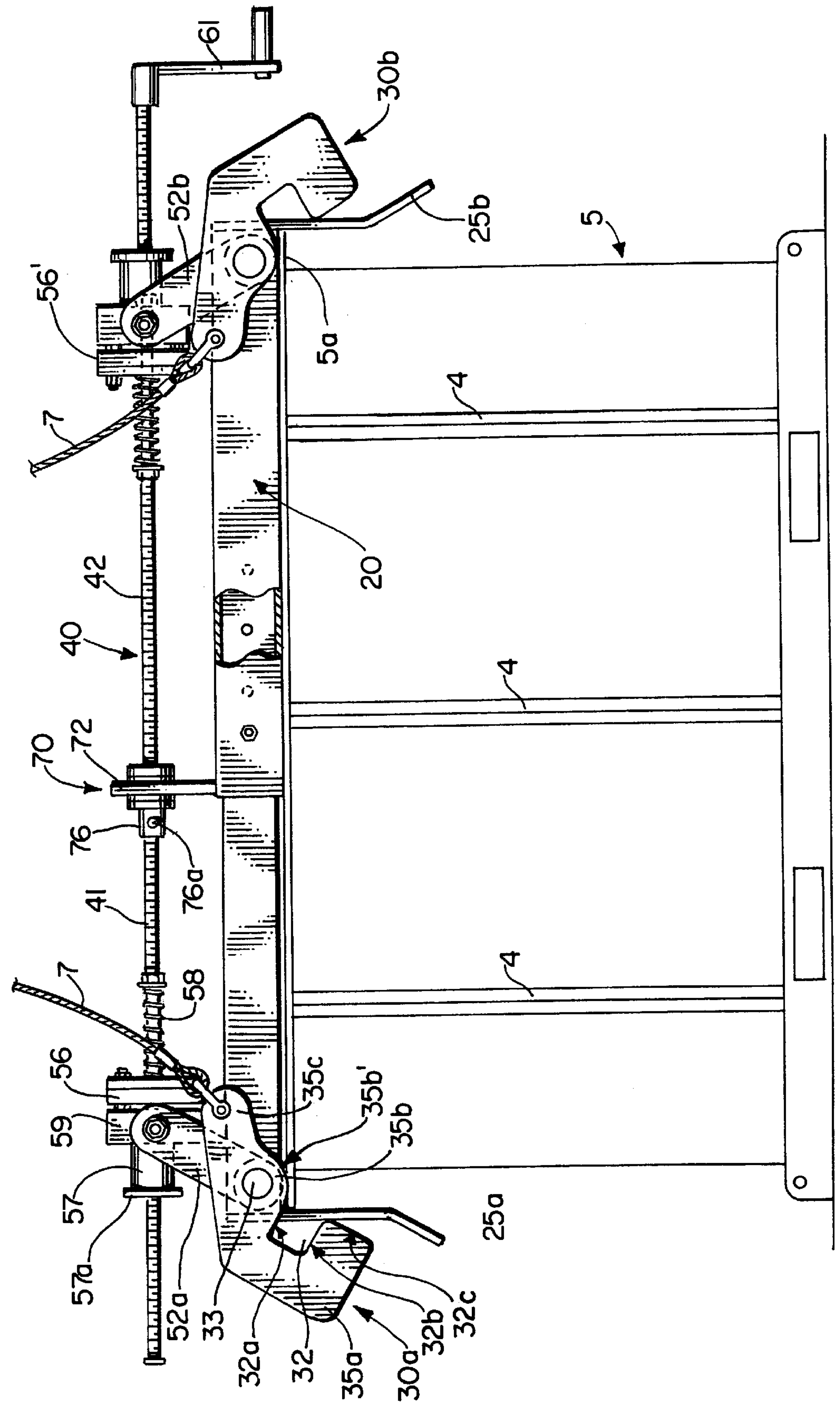
FIG. 3 illustrates a side view of the quick connect/disconnect tank lifting brace of FIG. 1 deployed on top of a tank and with lifting cables attached to the end clamps.
Figure 4:
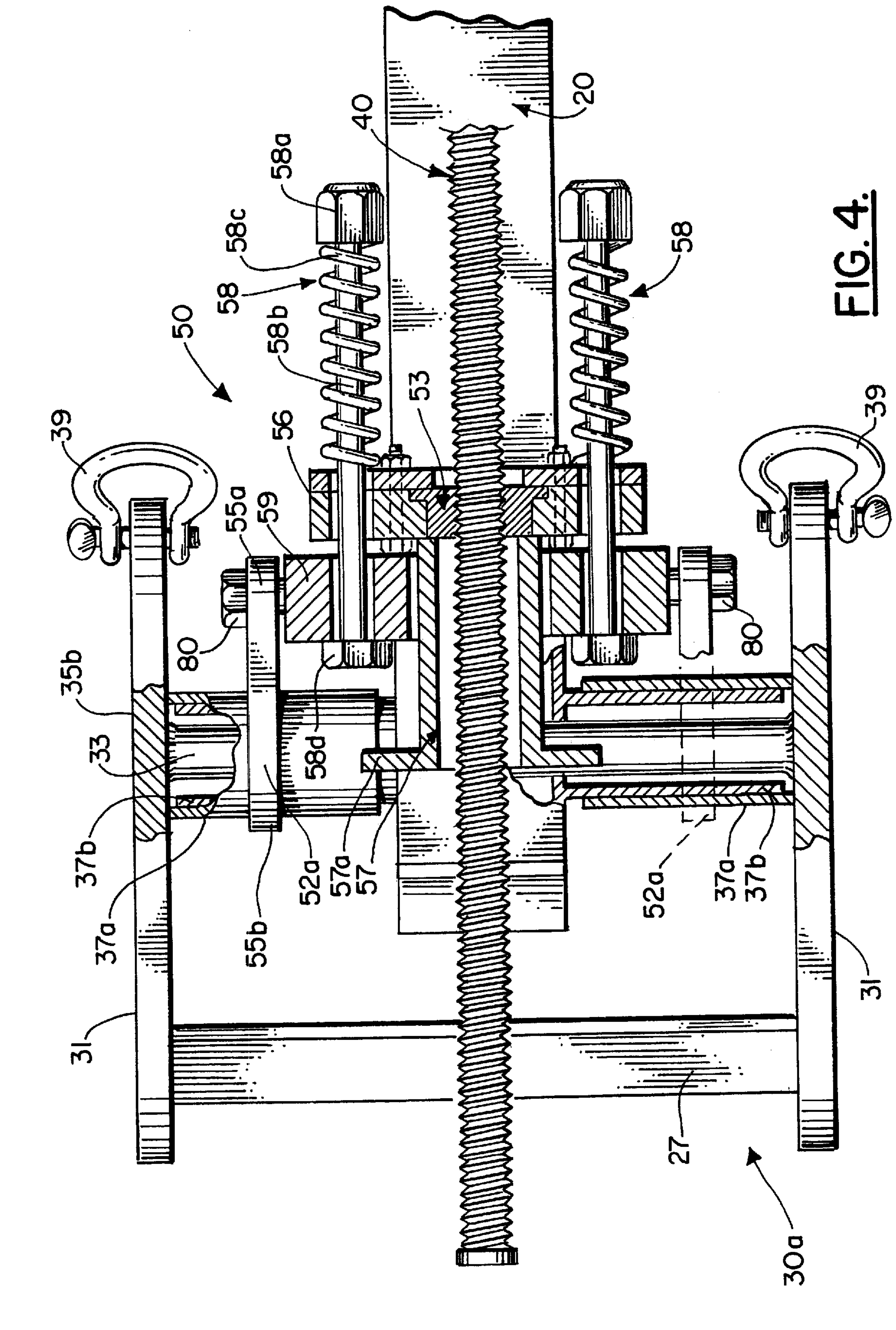
FIG. 4 illustrates a cross-sectional view along the plane of 4—4 of FIG. 1.
Figure 5:
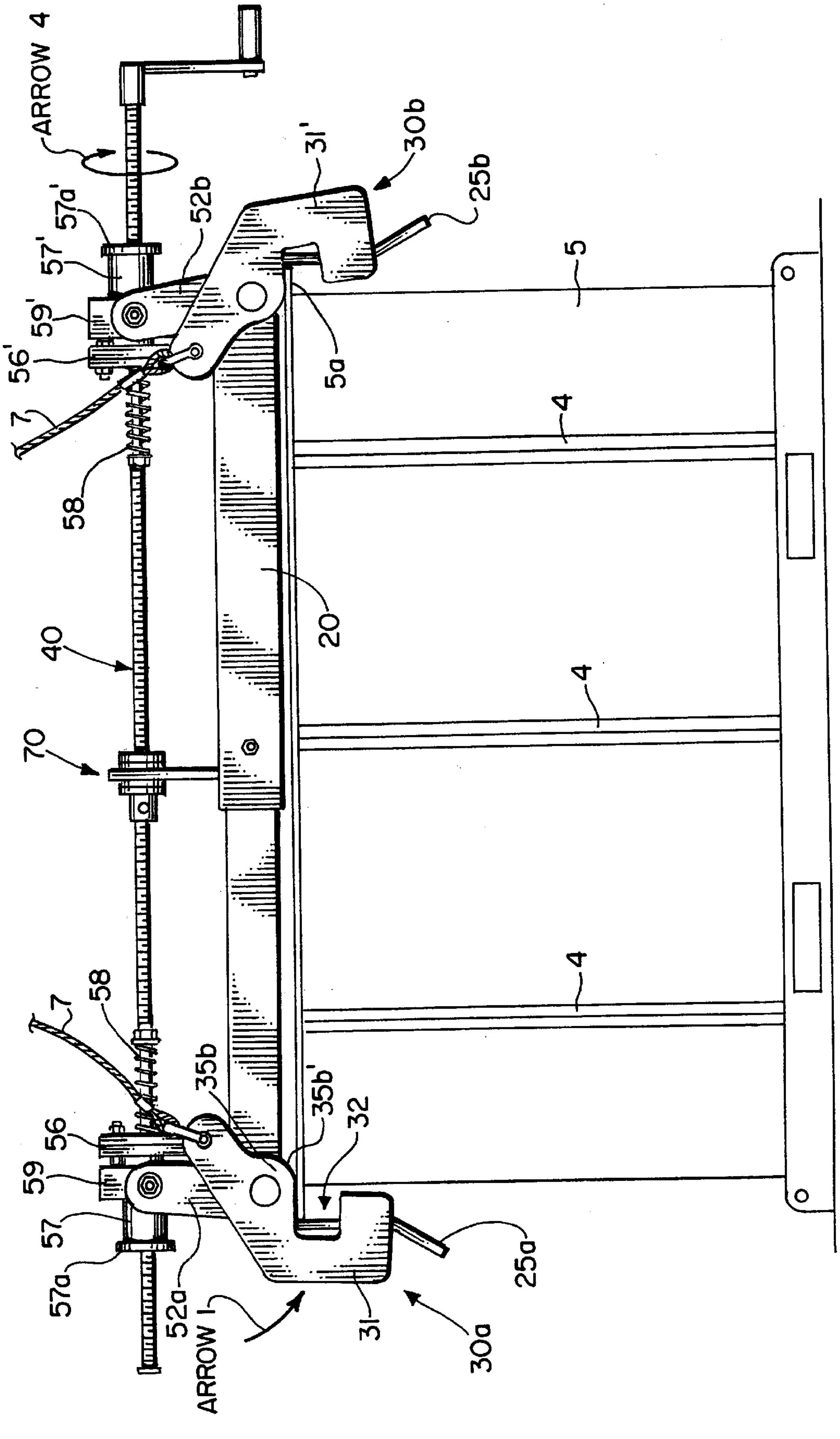
FIG. 5 illustrates a side view of the quick connect/disconnect tank lifting brace of FIG. 3 with the end clamps in a partially closed position.
Figure 6:
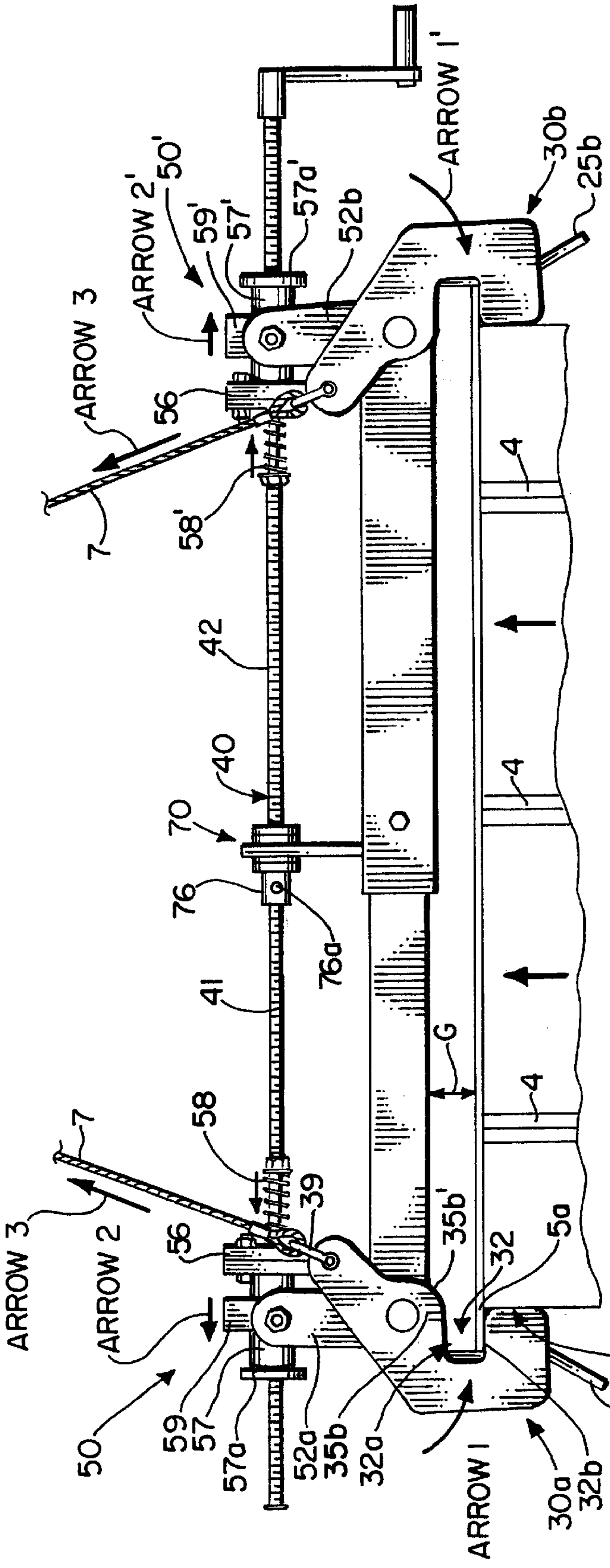
FIG. 6 illustrates a side view of the quick connect/disconnect tank lifting brace of FIG. 3 with the end clamps in a closed position and with a lifting force applied thereto; and, FIG. 7 illustrates a cross-sectional view along the plane 7—7 of FIG. 2.

As best seen in FIGS. 3, 5 and 6, during lifting in the direction of ARROWS 3 and 3', the weight of the tank 5 is transferred to the lifting cables 7. The lifting cables 7, during the tank lifting operations, provide a lifting force to the rear portion 35*c* and a counterbalancing moment force to counterbalance the force exerted by the weight of tank 5 directly applied to the forward portion 35*a*. Moreover, as the lifting brace 10 is lifted, the protruding arc-shaped edge 35*b*' is lifted off of the top lid or cover of tank 5 as well as the top interior surface 32*a*. Instead, the bottom interior surface 32*b* of the mouth or opening 32 engages the underside of the overhang 5*a*. Thus, a gap G is created between the top lid or cover and the underside of the crossbar 20.

Additionally, in the preferred embodiment, the width of each clamp pivoting assemblies 50 or 50' (that is, the distance between the outside edges of the paired (two) parallel plates 31 or 31', respectively) is limited to the distance between two adjacent vertical supports 4. Hence, if an unbalanced condition exists, the load exerted by tank 5 may cause the lifting brace 10 to slide along the overhang 5*a* in the fixed mouth or opening 32. If the clamp pivoting assemblies 50 and 50' are in the locked position, the vertical supports 4 will limit the slippage to the area within any two adjacent vertical supports 4. Moreover, if the brace 10 would slip to one side or toward the corner eyelets or padeyes, the corner eyelets or padeyes obstruct the brace 10 from slipping completely off of the tank 5.

Referring now to FIG. 4, in the exemplary embodiment, the end clamp pivoting assembly 50 includes two pivot arms 52*a* adapted to move in unison from an angled position (FIGS. 1 and 3) to a substantially vertical position (FIG. 6), a first bearing block 56, second slidable block 59 and spring-biased members 58 biasing the second slidable block 59 to the first bearing block 56. The end clamp pivoting assembly 50 further includes sleeve 57 having one distal end affixed or welded to the first bearing block 56. The other distal end has an end stop plate or flange 57*a*. The center of the first bearing block 56 has secured thereto, a threaded bushing 53 which engages the threads of the threaded actuating rod 40. Thus, during rotation of the threaded actuating rod 40, the first bearing block 56 tracks side to side along (that is, either toward the end of, or the center of, respectively) the threaded actuating rod 40. Hence, the threaded actuating rod 40 is an exemplary tracking mechanism for the first bearing block 56. In general, the first bearing block 56 functions to push and pull the spring biased second slidable block 59 via the tracking mechanism. In the direction away from the center rod support block 70, the first bearing block 56 directly pushes second slidable block 59. In the other direction (that is, toward the center rod support block 70), the first bearing block 56 pushes on the tension springs 58*c*, which pushes on the screw nut 58*a* which pushes screw shaft 58*b* causing the screw shaft 58*b* to pull the spring biased second slidable block 59 by the screw head 58*d*.

Each pivot arm 52*a* has a top end 55*a* and a bottom end 55*b*. The bottom end 55*b* is affixed to the exterior concentric cylinder 37*a* to allow pivot arm 52*a* to pivot or rotate about concentric cylinder 37*b*. The exterior concentric cylinder 37*a* is also affixed to the central portion 35*b* so that the pair of parallel plates 31 and pivot arms 52*a* are parallel and rotate in unison. The interior concentric cylinder 37*b* is coupled to the adjustable crossbar member 20. The interior concentric cylinder 37*b* serves as a stationary axle on which the exterior concentric cylinder 37*a* rotates. The two concentric cylinders 37*a* and 37*b* have pivot rod member 33 journalled therethrough along a central axis. One distal end of the pivot rod member 33 is coupled to one of the parallel plates 31 and the other distal end is coupled to the other parallel plate of the pair of parallel plates 31.

The top end 55*a* of the pair of pivot arms 52*a* is pivotally coupled to second slidable block 59 via bolting member 80. The top end 55*a* has formed therein a hole to receive and rotate on a bolt shaft of bolting member 80.

The spring-biased members 58 includes spring biased screws having a screw nut 58*a*, a screw shaft 58*b*, a tensioning spring 58*c* helically wound around the screw shaft 58*b* and a screw head 58*d*. The tension spring 58*c* is installed on the screw shaft 58*b* between the screw nut 58*a* and the first bearing block 56. The screw nut 58*a* may advantageously be used to adjust the bias of the tension spring 58*c*. The screw shaft 58*b* is slidably coupled through the first bearing block 56 and the second slidable block 59 to bias the second slidable block 59 to the first bearing block 56. Moreover, the spring biasing force eliminates any play between the first bearing block 56 and the second slidable block 59 when the lifting cables 7 are relaxed so that a more rapid disconnection to the open position can be achieved. In particular, if the end clamps 30*a* and 30*b* were not completely closed prior to lifting (i.e., prior to exerting a lifting force on the rear end 35*c*), then when disconnecting the lift brace 10 from the tank 5, the spring biasing force tends to urge the end clamps 30*a* and 30*b* to "pop open."

Referring still to FIG. 4, the tensioning spring 58*c* is shown in a substantially non-compressed state. In the substantially non-compressed state, the end clamps 30*a* and 30*b* could be fully opened, fully closed or at any stage in between the fully opened and the to fully closed states. In the non-compressed state, the distance or gap between the second slidable block 59 and the first bearing block 56 is the smallest. Thus, the end clamps 30*a* and 30*b* are biased upward to the open position so that, in operation when positioning the tank lift brace 10 to clutch the tank 5, the end clamps 30*a* and 30*b* are not engaged and, thus, will not obstruct the alignment of the brace 10 on tank 5.

Moreover, the tensioning spring 58*c* is designed to maintain the open state under the weight of brace 10. In other words when a crane or hoist lifts the brace 10 in the open state (open position) and, thus, no tank 5 is attached, the counterbalancing force exerted by the lifting cables 7 coupled to the rear portion 35*c* does not overpower the spring biasing force of the tensioning spring 58*c*. The net affect is that the end clamps 30*a* and 30*b* do not tend to close because the spring biasing force pulls the second slidable block 59 toward the first bearing block 56. If the spring biasing force were overpowered by the force exerted by the lifting cables 7 coupled to the rear portion 35*c*, the end clamps 30*a* and 30*b* would tend to close and the second slidable block 59 would tend to move away from the first bearing block 56.

As best seen in FIGS. 1 and 3, when the end clamps 30*a* and 30*b* are not being acted upon by a lifting force exerted through the lifting cables 7 coupled to the rear portion 35*c*, the first bearing blocks 56 and 56' and the second slidable blocks 59 and 59', respectively, are relatively close to each other or, in other words, side-by-side. When the threaded actuation rod 40 is rotated in a first direction (the direction of ARROW 4 of FIG. 5), the first bearing blocks 56 and 56' track along the threaded actuation rod 40 in a direction toward the rod's distal ends. Thus, the first bearing blocks 56 and 56' push the second slidable blocks 59 and 59', respectively, as the first bearing blocks 56 and 56' track along the threaded actuation rod 40. As the second slidable blocks 59 and 59' are pushed toward the rod's distal ends, pivot arms 52*a* and 52*b*, respectively, are pushed and pivoted so that the end clamps 30*a* and 30*b* are pivoted in the direction of ARROWS 1 and 1', respectively, to the closed or locked position, as best seen in FIG. 6. In other words, the pivot arms 52*a* and 52*b* are pivoted (or rotated) from an angled position to substantially a vertical position.

The end clamp pivoting assemblies 50 and 50' each have a built-in fail safe feature. The feature is designed to insure that the end clamps 30*a* and 30*b* do not close beyond a certain point. While lifting the tank 5, the end clamps 30*a* and 30*b* are prevented from "over" closing by limiting the travel of the second slidable block 59 by a stop plate 57*a*, as further described.

With reference to only the pivoting assembly 50, sleeve 57 is generally cylindrical with an interior diameter greater than the diameter of the threaded actuating rod 40 to provide for unobstructed movement therein by such rod 40. Moreover, +the sleeve 57 has a length which terminates at the end stop plate or flange 57*a*. Thus, if the threaded actuating rod 40 is not rotated enough so that the end clamps 30*a* and 30*b* are in a locked position (i.e., fully closed) (FIG. 6), as the counterbalance force exerted by the lifting cables 7 force (rotate) the end clamps 30*a* and 30*b* to the locked position, the first bearing blocks 56 and 56' will remain generally stationary or fixed while the second slidable blocks 59 and 59', respectively, slide along in the direction of ARROWS 2 and 2', respectively, toward the stop plate or flange 57*a* and 57*a*' or until the locked state or fully-closed position is achieved. As can be appreciated, as the distance increases between the first bearing block 56 and 56' and the second slidable blocks 59 and 59', respectively, the tensioning springs 58*c* and 58*c*' compress.

The tension of the biasing force of the tension springs 58*c* advantageously permits for some controlled slack or play (in comparison to 50 and 50' without springs 58*c* and 58*c*') so that, during rotation of the threaded actuating shaft 40, pivotal rotation of the end clamps 30*a* and 30*b* is essentially immediate and direct while accounting for various forces at work on 50 and 50' (more direct as the tensioning springs 58*c* and 58*c* ' become more compressed). The tension or biasing force created by the above arrangement allows the disconnect or the pivoting of the end clamps 30*a* and 30*b* to the open position to be easier especially if the end clamps 30*a* and 30*b* were not fully closed when rotating the threaded actuating rod 40 for lifting. Thus, the disconnect time to unwind and lift the end clamps 30*a* and 30*b* is reduced because the end clamps 30*a* and 30*b* tend to "pop open." Moreover, the tension or biasing force is relatively strong to avoid transferring certain loads which would be experienced by the threaded actuating rod 40 from end clamps 30*a* and 30*b*. FIGS. 1, 3, 5 and 6 illustrate possible positions of the pairs of pivot arms 52*a* and 52*b* and the end clamps 30*a* and 30*b*.

The brace 10 is designed to lift a filled tank 5 having an intended weight of 25,000 lbs. However, the brace 10 is designed to lift filled tanks much greater than 25,000 lbs. In some instances, the tank itself weighs approximately 2500 lbs. Ideally, during operation, the end clamps 30*a* and 30*b* when in their clamping or closed position would abut the sidewalls of the tank 5, as best seen in FIG. 6, so as to effectuate locking of the end clamps 30*a* and 30*b*. In other words, the forward lower exterior surface 32*c* of the mouth or opening 32 of each end clamps 30*a* and 30*b* is in surface-to-surface contact with the sidewall of the tank 5.

However, if the laborer did not fully lower end clamps 30*a* and 30*b* (so that they were locked in their locked position), as the tank 5 is lifted, the pairs of pivot arms 52*a* and 52*b* would tend to automatically pivot to the locked position without mechanical damage to the clamp pivoting assemblies 50 and 50'.

As can be appreciated, the biasing force created by the spring-biased members 58 enhances the performance by tending to keep open the end clamps 30*a* and 30*b* during the connection and alignment of the brace 10 and to permit rapid disconnection through the minimization of the number or revolutions necessary for opening the end clamps 30*a* and 30*b*.

Figure 7:
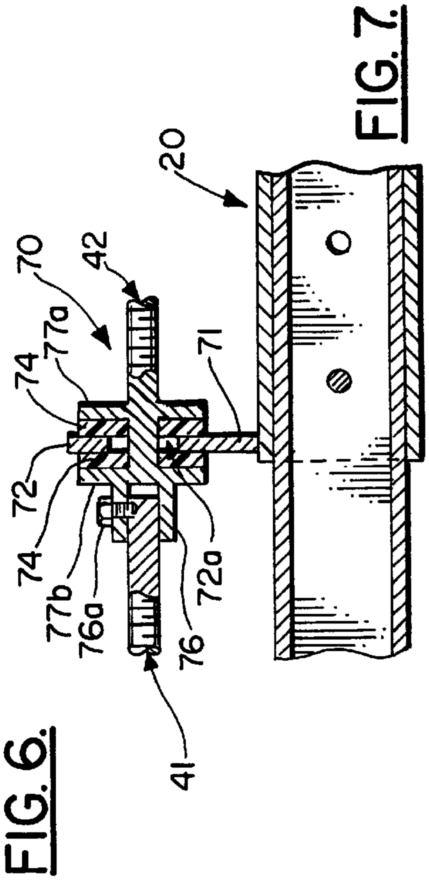

Referring now to FIG. 7, a cross-sectional view of the center rod support block 70 is shown. The center rod support block 70 is substantially coupled in the center or in close proximity to the center of the adjustable crossbar member 20. The center rod support block 70 supports threaded actuating rod 40 substantially parallel to the underlying adjustable crossbar member 20. The center rod support block 70 includes a base 71 and a upper rod guide 72 supported by the base 71 a predetermined distance above crossbar member 20. The rod guide 72 is sandwiched between two resilient Teflon washers or buffers 74. The rod guide 72 includes a center aperture 72*a* which is larger than the circumference of the threaded actuating rod 40. Therefore, the threaded actuating rod 40 is allowed to move, during its rotation, within the area of the center aperture 72*a* as the end clamps 30*a* and 30*b* are pivoted to and from the open and closed positions. In closing and opening the end clamps 30*a* and 30*b*, the threaded actuating rod 40 will tend to move away (up) from the crossbar member 20 when the end clamps 30*a* and 30*b* are being closed; and, the threaded actuating rod 40 will tend to move toward (down) the crossbar 20 when the end clamps 30*a* and 30*b* are being opened.

In the exemplary embodiment, threaded actuating rod 40 includes a first threaded rod section 41 and a second threaded rod section 42. The threaded rod sections 41 and 42 are oppositely threaded- one left and the other right. The center rod support block 70 includes a rod coupler 76 with a pin 76*a* for securing one end of the first threaded rod section 41 therein. The second threaded rod section 42 has one end affixed to the rod coupler 76 in a manner similar to the first threaded rod section 41. However, the pin is not shown. The first threaded rod section 41 extends from the rod coupler 76 to the clamp pivoting assembly 50. The length of the first threaded rod section 41 and the second threaded rod section 42 extends beyond the rotational plane of the end clamps 30*a* and 30*b* to provide the necessary clearance for the rotation of the handle 61 without interference. The threaded rod 42 further includes two washers 77*a* and 77*b* positioned on the exterior sides of the two resilient Teflon washers or buffers 74.

The threaded actuating rod 40 is adapted to be extended in length by inserting an extension coupler (NOT SHOWN) between the first threaded rod section 41 and rod coupler 76.

METHOD

The present invention contemplates the use of the quick connect/disconnect tank lifting brace 10 in the oil field environment for rapid loading and offloading of tanks, whether filled or unfilled. Nevertheless, the quick connect/ disconnect tank lifting brace 10 can be used on barges, on docks, and in warehouses. The quick connect/disconnect tank lifting brace 10 is designed to be quickly connected to a tank 5 either on an oil field platform or on a water vessel and subsequently disconnected after the tank 5 has been lifted and transferred between the platform and the vessel. Additionally, the tank 5 may be lifted to or from a barge, a dock, an onshore platform, etc.

The present invention intends to position the quick connect/disconnect tank lifting brace 10 along a centerline of the tank 5 so that the tank 5 is balanced during the lifting and transport. The tank 5 preferably includes an overhang 5*a* or the like so that the mouth 32 of the pivotal end clamps 30*a* and 30*b* would be capable of receiving the overhang 5*a* or the like.

During connection or disconnection, all that is essentially required is the rotation of the handle member 61 by a single laborer and a hoist to connect to the lifting cables 7. As the handle member 61 is rotated in a first direction, both pivotal end clamps 30*a* and 30*b* would be lowered or rotated in unison from a spring-biased open position. Once the pivotal end clamps 30*a* and 30*b* are lowered or rotated to a closed or locked position, the lifting cables 7, lift the tank 5 via a hoist or crane (NOT SHOWN)

Since, the tank lift brace 10 does not connect to eyelets (padeyes) or other discretely positioned couplers time savings can be achieved during both connection and disconnection. During disconnection, as the handle member 61 is rotated in a second direction, both pivotal end clamps 30*a* and 30*b* would be raised or rotated to an open position simultaneously. Thereafter, the tank lift brace 10 could be raised and immediately moved and placed on another tank.

In summary, the method of lifting of a tank 5 with the quick connect/disconnect tank lifting brace 10 comprises the step of positioning the quick connect/disconnect tank lifting brace 10 over a top cover or lid of a tank 5. Preferably, the lifting brace 10 is positioned over the centerline of the tank 5. Moreover, prior to position the lifting brace 10 over the top cover or lid of the tank 5, the length of the adjustable crossbar member 20 may require adjustment.

After, the lifting brace 10 has been positioned, the method includes applying a pivoting force to effectuate pivoting, in unison, of end clamps 30*a* and 30*b* having a mouth 32 so that the overhang 5*a* of the top cover or lid is received in the mouth 32. Thus, the lifting brace 10 is effectively secured to the tank 5. Thereafter, the method includes lifting the rear portion of the end clamps 30*a* and 30*b* with lifting cables 7 affixed thereto to effectuate a lifting force to an underside of the overhang 5*a* and a counterbalancing moment force to counterbalance the weight of the tank 5.

In a preferred embodiment, the pivoting step includes pivoting, in unison, the end clamps 30*a* and 30*b* until a front surface (the forward lower exterior surface 32*c*) of each end clamp 30*a* and 30*b* abuts or is in direct contact with a sidewall of the tank 5 to effectuate locking of the end clamps 30*a* and 30*b*. In the preferred embodiment, the end clamps 30*a* and 30*b* should be locked prior to lifting. Thus, the pivoting should terminate when the end clamps 30*a* and 30*b* are locked.

When, lifting the tank 5, the lifting step may include attaching the lifting cables 7 to a hoist or crane (not shown).

In another preferred embodiment, if the end clamps 30*a* and 30*b* are not locked, during lifting of the tank 5, the end clamps 30*a* and 30*b* will become automatically locked such as through the end stop plates or flanges 57*a* and 57*a*', respectively. Alternately, the end clamps 30*a* and 30*b* will continue rotating until the front surface (the forward lower exterior surface 32*c*) of each end clamp 30*a* and 30*b* abuts or is in direct contact with a sidewall of the tank 5 to effectuate locking. By not fully locking the end clamps 30*a* and 30*b* prior to lifting, it can take less time to connect and disconnect the tank 5, thus increasing the overall efficiency of the lifting operation.

It should be noted that during the positioning step, the method includes applying a spring biasing force to the end clamps 30*a* and 30*b* to maintain the mouth or opening 32 in an open position. Moreover, during the disconnect of the brace 10, the method includes applying the spring biasing force to the end clamps 30*a* and 30*b* while pivoting the end clamps 30*a* and 30*b* to an open position or state.

In general, the pivoting assemblies 50 and 50' operate to open and close the end clamp 30*a* and 30*b* via push to close and pull to open motions along a tracking mechanism or the threaded actuating rod 40.

It is noted that the embodiment of the quick connect/disconnect tank lifting brace and method of use described herein in detail, for exemplary purposes, are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A quick connect/disconnect tank lifting brace for use with a tank with a top lid having an overhang comprising:

a crossbar having distal ends;

pivotal end clamps, each end clamp pivotally coupled to a respective one of the distal ends;

a pair of clamp pivoting assemblies, each clamp pivoting assembly pivots a respective one of the pivotal end clamps via a pair of pivot arms; and, a threaded actuating rod parallel to the crossbar and coupled to the pair of pivoting assemblies wherein rotation of the threaded actuating rod effectuates, in unison, pivoting of each pair of pivot arms via the pivoting assemblies.

2. The lifting brace of claim 1, wherein said each clamp pivoting assembly includes at least one tension spring which spring-biases the pivotal end clamps to an open position.

3. The lifting brace of claim 1, wherein each clamp pivoting assembly comprises:

a first bearing block having the threaded actuating rod threaded therethrough;

a sleeve coupled to the first bearing block and having the threaded actuating rod journalled therethrough;

a second slidable block having coupled on opposite sides thereof the pair of pivot arms wherein the rotation of the threaded actuating rod effectuates pushing of the second slidable block by the first bearing block to push or pivot the pivot arms; and, a pair of spring-biased members biasing the second slidable block to the first bearing block.

4. The lifting brace of claim 1, wherein:

the pair pivot arms are adapted to pivot from a angled position to a substantially vertical position wherein the angle position corresponds to an open position of the end clamps; and, said each clamp pivoting assembly includes at least one tension spring which spring-biases the pivotal end clamps to an open position.

5. The lifting brace of claim 1, wherein the end clamps comprises:

two end plates fixedly secured in parallel spaced relation via cross pivoting rod pivotally coupled to the crossbar, each end plate comprising:

a forward portion of end clamp having formed therein a mouth, a central portion coupled to the cross pivoting rod, and a rear portion having a hole formed therein for attaching thereto a lifting cable.

6. The lifting brace of claim 5, wherein:

the mouth has a generally squared "C"-shaped profile; and, the central portion includes a protruding arc-shaped edge which defines an arc of rotation of the end clamps for rotating the mouth in and out of the open and closed positions and provides the footing for balancing the crossbar on the top lid of the tank.

7. The lifting brace of claim 5, further comprising:

a shackle coupled the rear portion of the end clamps;

lifting cables each cable coupled to a respective one of the shackles; and, during lifting, the weight of a tank is transferred to the lifting cables to provide a counterbalancing moment force to counterbalance the weight of the tank directly applied to the forward portions of the parallel plates.

8. The lifting brace of claim 1 further comprising:

a rod support block affixed to said crossbar, the rod support assembly comprising:

a base affixed to the crossbar;

a rod guide supported, by the base, a predetermined distance above said crossbar wherein the rod guide includes a center aperture formed therein having a perimeter which is larger than the circumference of the threaded actuating rod; and buffers coupled to opposing sides of the rod guide.

9. The lifting brace of claim 8, wherein the threaded actuating rod comprising:

a coupler;

a first threaded rod section having one end coupled to the coupler and the other end coupled to one of the two clamp pivoting assemblies; and, a second threaded rod section having one end coupled to the coupler and the other end coupled to the other of the two clamp pivoting assemblies via the rod support block and wherein the second threaded rod section is threaded in a direction which is opposite the first threaded rod section.

10. A quick connect/disconnect tank lifting brace for use with a tank with a top lid having an overhang comprising:

a crossbar having distal ends;

pivotal end clamps, each end clamp pivotally coupled to a respective one of the distal ends;

a pair of clamp pivoting assemblies, wherein each clamp pivoting assembly pivots a respective one of the pivotal end clamps between an open position and a closed position and biases said respective one of the pivotal end clamps to said open position; and, an actuating rod parallel to the crossbar and coupled to the pair of pivoting assemblies wherein articulation of the actuating rod effectuates, in unison, pivoting of each pair of pivot arms via the pivoting assemblies to a closed position.

11. The lifting brace of claim 10, wherein each clamp pivoting assembly comprises:

a first bearing block having the threaded actuating rod threaded therethrough;

a sleeve coupled to the first bearing block and having the threaded actuating rod threaded therethrough;

a second slidable block having coupled on opposite sides thereof the pair of pivot arms wherein the rotation of the threaded actuating rod in a first direction effectuates a first tracking movement of the first bearing block to push the second slidable block to close the end clamps or in a second direction effectuates a second tracking movement to pull the second slidable block and open the end clamps; and, a pair of spring-biased members coupled to the first bearing block and the slidable block biasing the first bearing block to the second slidable block.

12. The lifting brace of claim 11, wherein the second slidable block is adapted to slide along said sleeve to lock said end clamp once said first bearing block is stationary.

13. The lifting brace of claim 10, wherein the pair of pivot arms are adapted to pivot from an angled position to a substantially vertical position wherein the angle position corresponds to an open position of the end clamps.

14. The lifting brace of claim 10, wherein the end clamps comprises:

two end plates fixedly secured in parallel spaced relation via cross pivoting rod pivotally coupled to the crossbar, each end plate comprising:

a forward portion of end clamp having formed therein a mouth, a central position affixed to the cross pivoting rod, and a rear portion having hole formed therein for attaching thereto a lifting cable.

15. The lifting brace of claim 14, wherein:

the mouth has a generally squared "C"-shaped profile;

the central portion includes a protruding arc-shaped edge which defines an arc of rotation of the end clamps for rotating the mouth in and out of the open and closed positions and provides the footing for balancing the crossbar on the top lid of the tank.

16. The lifting brace of claim 14, further comprising:

a shackle coupled the rear portion of the end clamps;

lifting cables each cable coupled to a respective one of the shackles; and, during lifting, the weight of a tank is transferred to the lifting cables to provide a counterbalancing moment force to counterbalance the weight of the tank directly applied to the forward portions of the parallel plates.

17. A quick connect/disconnect tank lifting brace for use with a tank with a top lid having a overhang comprising:

a crossbar having distal ends;

pivotal end clamps, each end clamp pivotally coupled to a respective one of the distal ends;

a pair of clamp pivoting assemblies, each clamp pivoting assembly pushes to pivotally close, via a pushing motion, and, alternately, pulls to pivotally open, via a pulling motion, a respective one of the pivotal end clamps and biases said respective one of the pivotal end clamps to an open position; and, an actuating track mechanism coupled to the crossbar and coupled to the pair of pivoting assemblies wherein actuation of the actuating track mechanism effectuates, in unison, the pushing motion to pivot the end clamps to a closed position or the pulling motion to pivot the end clamps back to the open position.

* * * * *